May 15, 1962 W. R. STELLING, JR., ETAL 3,034,780
MACHINE AND METHOD FOR SHEETING AND INTERFOLDING MATERIAL
Filed Feb. 3, 1960 4 Sheets-Sheet 1
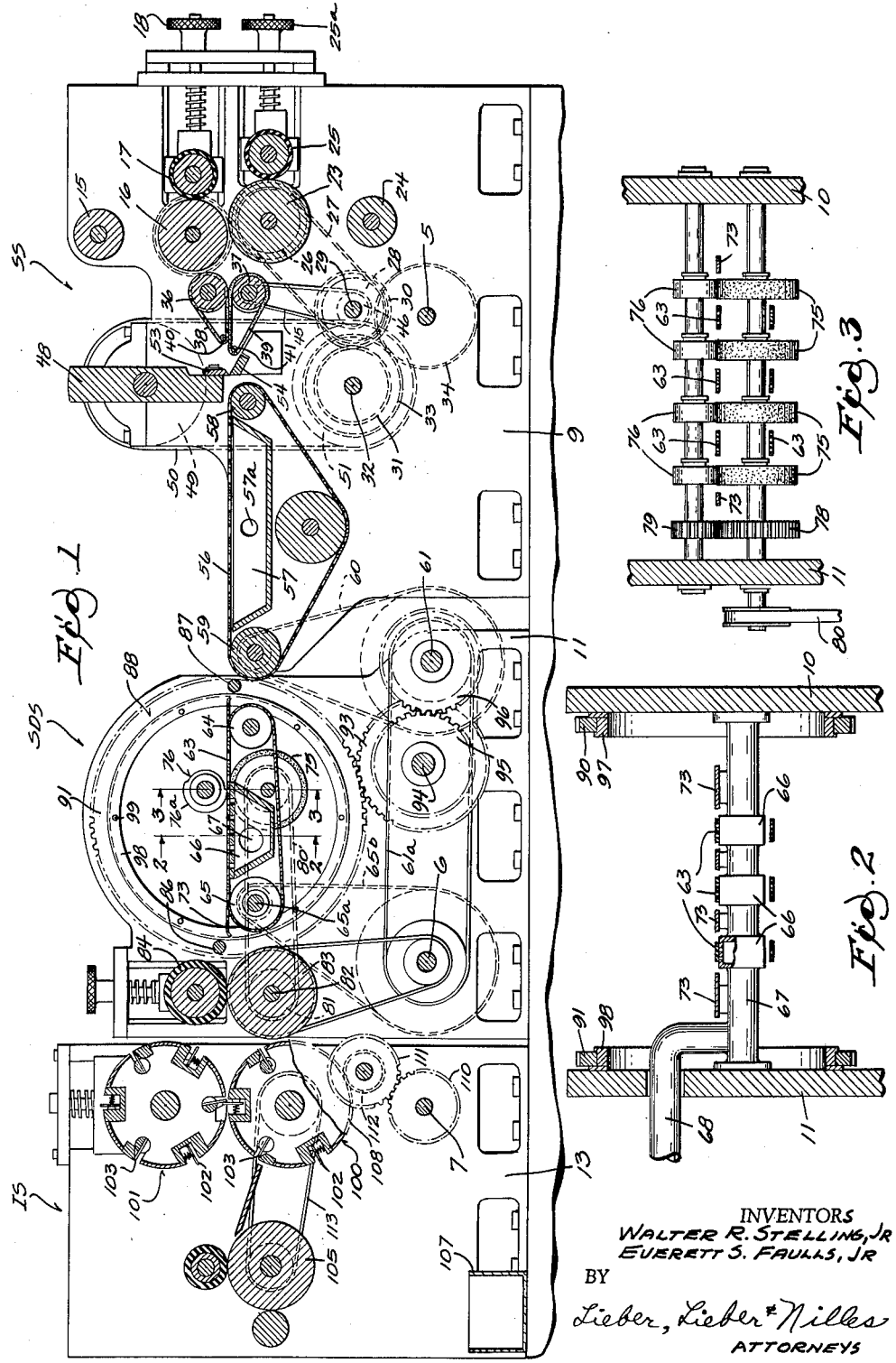
INVENTORS
WALTER R. STELLING, JR
EVERETT S. FAULKS, JR
BY
Lieber, Lieber & Nilles
ATTORNEYS

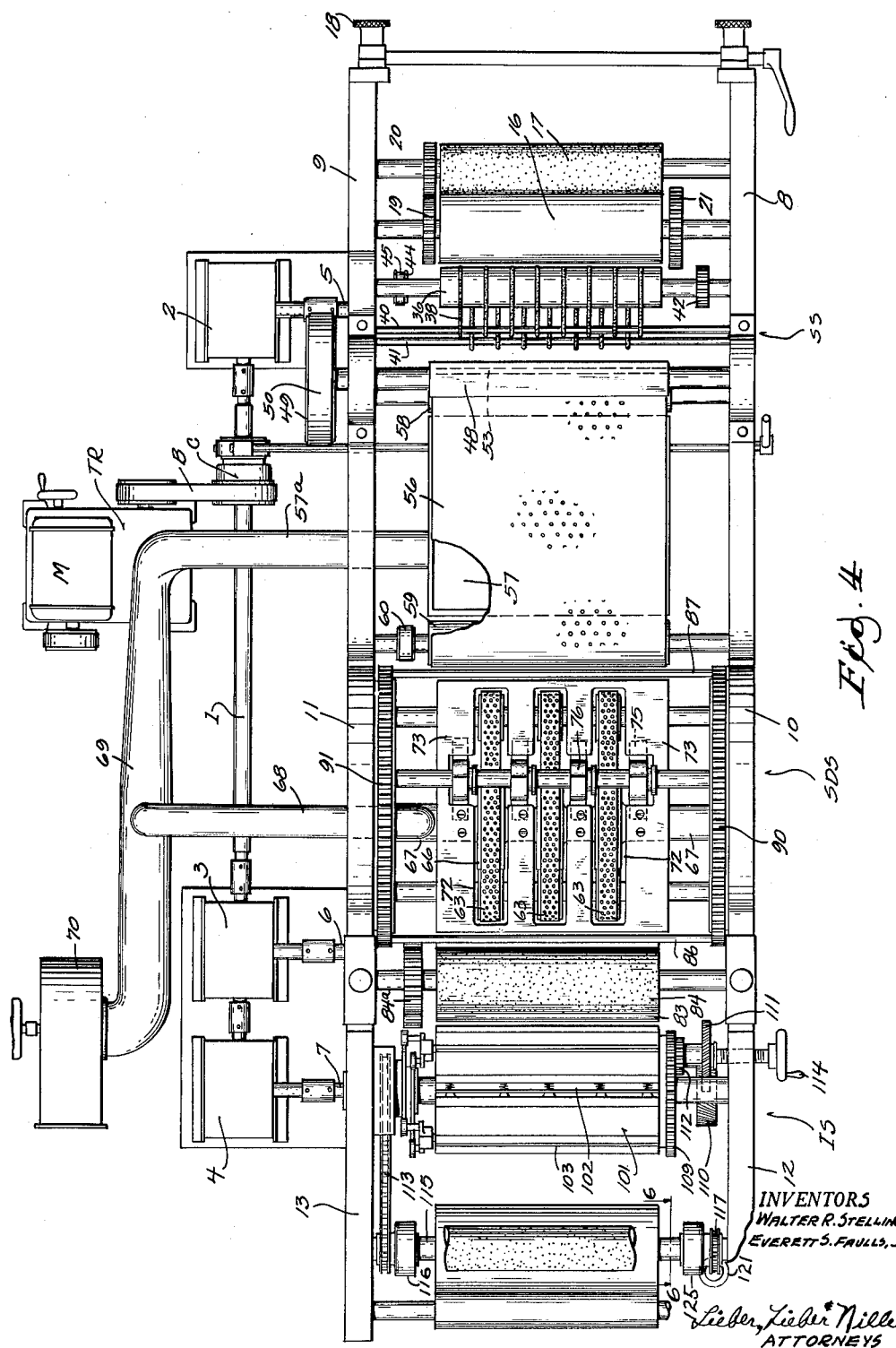

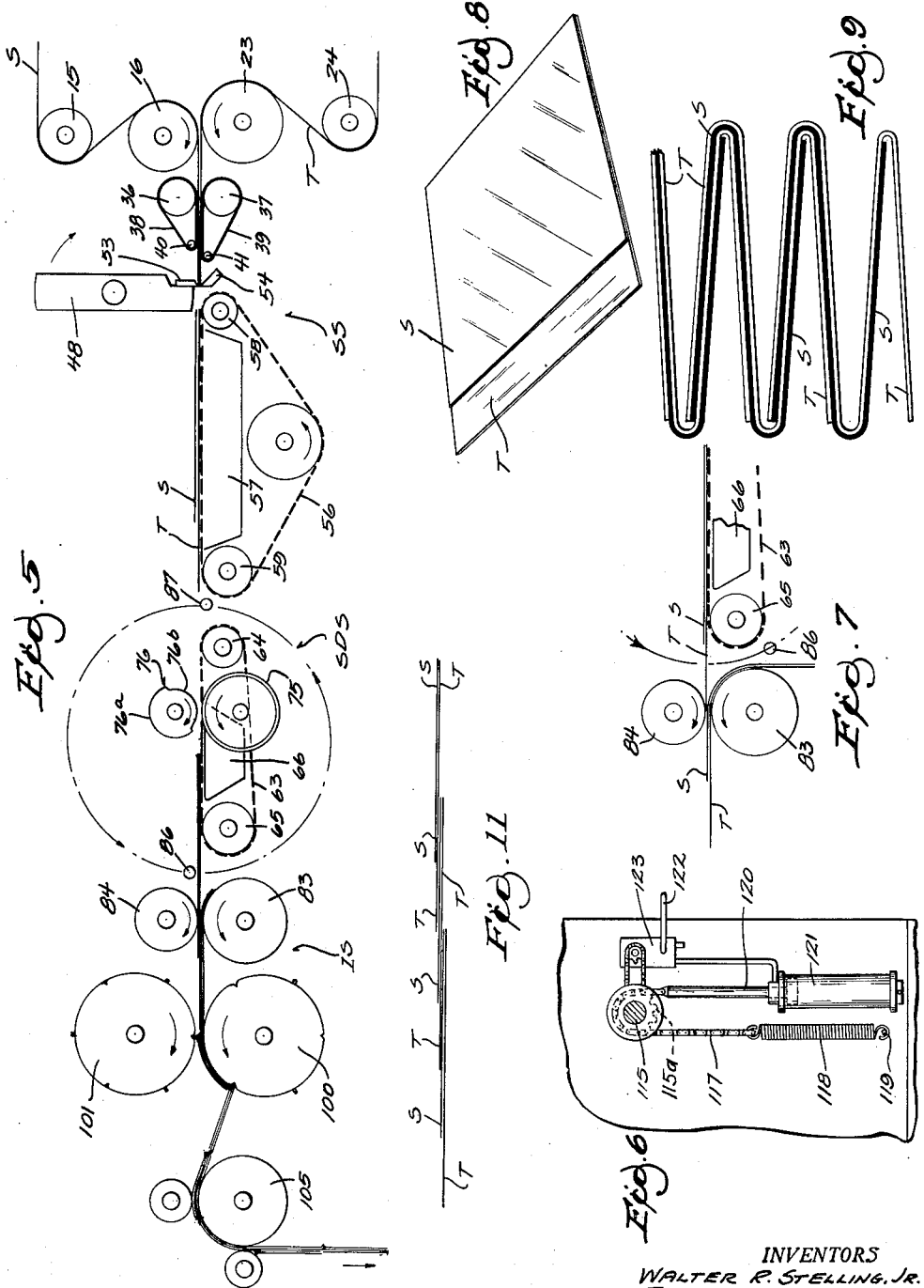

INVENTORS
WALTER R. STELLING, JR.
EVERETT S. FAULLS, JR.
BY
Lieber, Lieber & Nilles
ATTORNEYS United States Patent Office
3,034,780
Patented May 15, 1962

3,034,780
MACHINE AND METHOD FOR SHEETING AND INTERFOLDING MATERIAL
Walter R. Stelling, Jr., and Everett S. Faulls, Jr., Milwaukee, Wis., assignors to Faustel, Inc., Milwaukee, Wis., a corporation of Wisconsin
Filed Feb. 3, 1960, Ser. No. 6,536
11 Claims. (Cl. 270—39)

The present invention relates generally to a machine and method for associating, cutting and interfolding two different sheets of material.

The present invention finds particular utility in interfolding certain sheet material, such as saran, which adheres readily to itself. Sheets of such material cannot be placed directly on one another because they stick together upon contact. It is therefore necessary to provide a piece of tissue between each of these highly cohesive sheets in order that they may be readily pulled apart. Furthermore, it may be desirable for other reasons to provide a pair of interfolded sheets of different material so that one sheet, which may be moisture proof can be used to hold the moisture captive, while the other sheet is used as an overwrap for the same article.

In addition to the above requirement for interfolded sheets of different properties, it is necessary, for example, to have the tissue somewhat longer than the saran in order that it may be readily grasped and a pair of sheets pulled in "pop-up" fashion from the rest of the pairs of interfolded sheets.

Accordingly, the present invention provides an improved machine and method for associating two webs of different materials together, cutting the leading edge of each material together, conveying the webs of material together and at the same time moving them relative to one another to provide a longer length of one of the materials, cutting the webs together to form trailing edges of a pair of sheets of material having one sheet of each pair longer than the other, conveying each pair of sheets together to interfolding rolls, and just prior to entry into said rolls causing each pair to be slowed down to thereby permit proper overlapping of the pairs before being folded.

A more specific aspect of the invention provides a novel "slow-down" section for a machine of the above type by means of which each pair of sheets is conveyed at the normal speed by suction means, is slowed down in its travel in timed relationship with the previous pair and is conveyed at this slowed speed to the interfolding rolls. The tail end of each pair is knocked down by a rotating knock down means of the "slow-down" section to thereby ensure proper overlapping of the subsequent pair of sheets.

More specifically, the improved "slow-down" sections include.

(1) Suction belts by means of which both sheets of material are conveyed together.

(2) Segmented slow down rolls between the belts which briefly contact and thereby slow down the pairs of sheets until they are grasped by slower moving feed rolls, and (3) A rotary knock-down member which encompasses said belts and slow-down rolls and acts to knock down the trailing end of the pair thereby quickly removing that pair from the belts and ensuring proper overlapping of the next pair.

Yet another and more specific aspect of the invention relates to the improved rotary knock-down member having diametrically opposed sheet contacting bars which move in a path that encircles the belts and slow-down rolls.

Another aspect of the invention provides an improved means for associating a pair of webs together for cutting by a single knife, then moving the webs together and relative to one another to provide a longer feed of one of the webs, after which the webs are again cut together thus forming a pair of sheets of different lengths.

These and other objects and advantages will appear later as this disclosure progresses, reference being had to the accompanying drawings, in which:

FIGURE 1 is an elevational view in section of a machine embodying the present invention, certain parts being shown as broken away or removed for clarity;

FIGURE 2 is a sectional view taken on line 2—2 in FIGURE 1 and showing the vacuum chambers and manifold for the slow-down section;

FIGURE 3 is a sectional view taken on line 3—3 in FIGURE 1 and showing the slow-down rolls;

FIGURE 4 is a plan view of the machine shown in FIGURE 1, certain parts being shown as broken away;

FIGURE 5 is a schematic side elevational view showing how the pairs of sheets move through the machine in timed relationship with one another;

FIGURE 6 is an elevational sectional view of the overrunning clutch and its actuating means for separating interfolded pairs into batches, the view being taken on line 6—6 in FIGURE 4;

FIGURE 7 is a detail view of the feed rolls of the slow-down section and the relative positions of two pairs of sheets in relation to these rolls;

FIGURE 8 is a perspective view of a pair of sheets before interfolding;

FIGURE 9 is an enlarged side view of several pairs of completed interfolded sheets;

FIGURE 11 is a side view of the relative positions of several pairs of sheets as they pass through the interfolder rolls.

GENERAL ORGANIZATION

Figure 10:
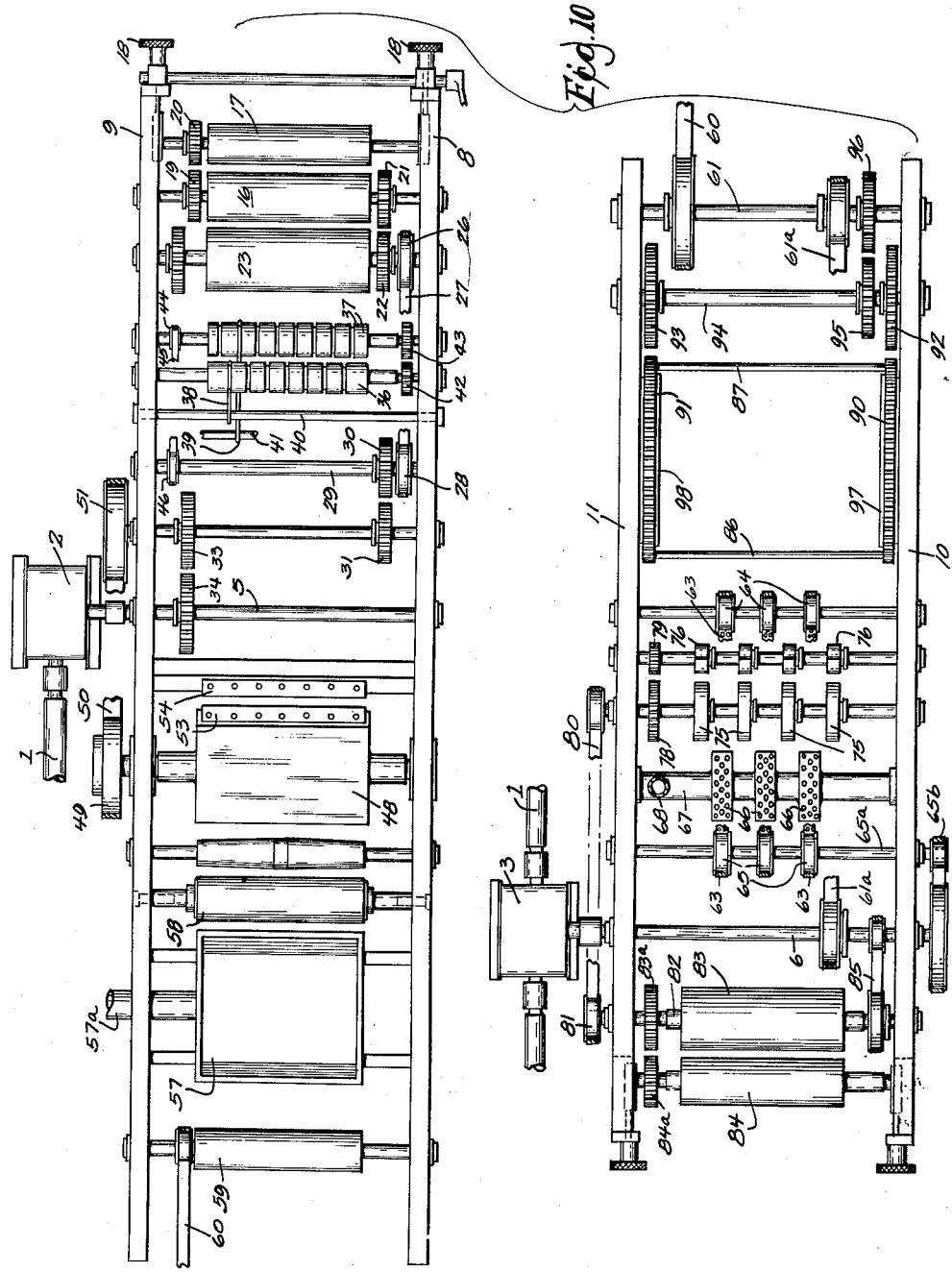
FIGURE 10 is an extended or exploded plan view of the drive arrangement for various parts of the sheeter and slow-down sections of the machine, certain parts being broken away or removed for clarity.

The machine made in accordance with the present invention includes a sheeter section SS, slow-down section SDS, and the interfolder section IS, which sections are driven by the electric motor M (FIGURE 4), through a variable speed transmission TR, drive belt B, main clutch C, main drive shaft 1 and the right angle drive units 2, 3 and 4 and respective shafts 5, 6 and 7 extending therefrom and suitably journalled in their respective sections. More specifically, shaft 5 is journalled in the vertical sides 8 and 9, shaft 6 in sides 10 and 11 and shaft 7 in sides 12 and 13.

The various rolls and shafts hereinafter referred to are suitably journalled in their respective sides in conventional anti-friction bearings for high speed operation and it is not thought necessary to refer in detail to the mountings for these rolls and shafts.

For purposes of illustrating the invention, reference will be made to two webs of flexible material, one of saran and one of a light paper tissue and the invention finds considerable utility in associating, cutting and interfolding such a combination. However, the invention should not be construed as being limited to any particular type or combination of materials.

Sheeter Section

The web of saran S is pulled from a supply roll (not shown) and over an idler roll 15 which is rotatably mounted in the sides 8 and 9 of the sheeter section. The saran is pulled by the feed rolls 16 and 17, the latter of which is movable by the hand wheel 18 in the conventional manner to vary the nip pressure between rolls 17 and 16. Rolls 16 and 17 are synchronized by their respective constant mesh gears 19 and 20. Roll 16 also has a gear 21 fixed therewith by which it is driven through gear 22 of feed roll 23.

The tissue T is pulled from its supply roll (not shown) and over the idler roll 24 by the feed rolls 23 and 25, the latter being conventionally adjustable by hand wheel 25a to vary the nip pressure between feed rolls 23 and 25. Roll 23 has a pulley 26 fixed thereto which is driven by belt 27, the belt also being trained around a pulley 28 fixed to shaft 29. Shaft 29 has a gear 30 which is in constant mesh with a gear 31 fixed to shaft 32. Shaft 32 in turn is driven through a gear 33 fixed thereto and meshing with gear 34 fixed to the shaft 5. In this manner, the feed rolls 16, 17 and 23, 25 are all driven for positive feed of the saran and tissue webs.

It will be noted that feed roll 23 is larger than feed roll 16 but their gears 21 and 22 are of the same size. As a result, the web of tissue is fed faster than the web of saran, for purposes that will appear later.

A novel tensioning means is provided immediately after the fed rolls 16 and 23 which acts to keep both the saran and tissue tight as they leave the feed rolls. This means comprises the rollers 36 and 37 which have grooves formed around their peripheries and in which are trained a series of endless belts 38, 39 respectively. These belts may consist of conventional flexible O-rings and they are also trained around their respective shaft 40 and 41. Rollers 36 and 37 and shafts 40 and 41 are all suitably mounted in antifriction bearings in the sides 8 and 9 of the sheeter section. Rollers 36 and 37 are synchronized by their meshing gears 42, 43 and are driven through the pulley 44 fixed to roller 37 and belt 45 which is also trained around pulley 46 fixed on shaft 29. The pulley sizes are such that the linear speed of the endless belts is greater than the peripheral speed of the larger feed roll 23. In practice, an over speed of about 10 percent of the belts over the feed roll 23 has proved to be very satisfactory in acting to continually pull the saran and tissue tight as they come from their feed rolls. The belts actually slip or slide over the saran and tissue to maintain them taut as they are moved together toward the cutting means now to be described.

The cutting means comprises a rotary member 48 suitably journalled in the sides 8 and 9, and driven through its pulley 49, timing belt 50 and pulley 51 on shaft 32. A knife 53 is secured to member 48 and registers with the fixed shear bar 54 to produce a cut in the saran and tissue for every revolution of the cutting means. This cut is made on the continually moving webs to thereby produce a pair of sheets, one sheet of saran placed on top of one sheet of tissue.

As a pair of sheets leaves the cutting means, it is carried by the upper flight of an endless, perforated belt 56 which passes over a suction chamber 57 located within the endless belt. A suction conduit 57a extends from one end of the chamber and is connected to suction producing means, as will appear. This chamber produces a suction through the upper flight of the perforated belt and acts to hold both the saran and tissue firmly on the belt for conveyance together from the cutting means to the slow-down section SDS. This endless suction belt 56 is trained over suitable rollers 58, 59, the latter of which is driven by a belt 60 trained around suitable pulleys on roller 59 and a shaft 61. Shaft 61 is driven from shaft 6 through belt 61a and suitable pulleys. The speed of conveyor belt 56 is faster than the peripheral speed of feed roll 23 so that a space or gap is provided between each pair of sheets. In other words, the pairs are taken away from the cutting means faster than either web is fed to the cutting means.

As shown in FIGURE 5, the sheets of each pair are arranged with their trailing edges in alignment as they leave the cutting means and they remain in this position relative to one another. The tissue is longer than the saran by about 33% of the saran length and provides a leading edge which can be grasped when it is desired to use a pair, as will appear.

Slow-Down Section

As the pairs leave the sheeter section, they are transferred to a series of three traversely aligned, endless, and perforated belts 63, of the slow-down section. These belts are spaced apart in a transverse direction, and are trained around suitable spaced apart rollers 64 and 65. The shaft 65a carrying rollers 65 is driven from shaft 6 by suitable pulleys and belts 65b. The perforated belts 63 pass over their respective vacuum boxes 66 carried by and in suction communication with the suction manifold 67. The top side of the boxes 66 is perforated (FIGS. 1 and 10) so as to support the thin and flexible perforated belts 63 and still permit suction through. A suction conduit 68 leads from the manifold to the main suction conduit 69 that in turn is connected with the suction producing means in the form of a blower 70.

The upper flights of the belts 63 travel between slots 72 in the sheet metal table 73. The belts are flush with the top of the table and together with it form a smooth surface over which the sheets are moved.

Located between the belts 63 are the pairs of slow-down rollers, the lower roller of each being a rubber wheel 75 and the upper roller being a segmented steel wheel 76. The raised or diametrically larger portion 76a of each steel wheel is adapted to bear against its corresponding rubber wheel to grip a pair of sheets passing therebetween and thereby slow the pair down and cause the suction belts to slip along the lower sheet. When the cut-away or relief portion 76b is over the sheets, the sheets are not grasped by the slow-down rolls and belts 63 then move them at the same speed as belt 56. Rollers 75 and 76 are synchronized by their meshing gears 78, 79 and rollers 75 are driven through belt 80 from the pulley 81 fixed on shaft 82. Thus, the slow-down rolls or wheels 76 and 75 act to slow down the pair of sheets for entry of the sheets into the feed rolls to now be described.

A lower feed roll 83 is mounted on shaft 82 and is engaged by the upper adjustable feed roll 84. Rolls 83 and 84 are synchronized by their constant mesh gears 83a and 84a. Roll 83 is driven from shaft 6 by suitable pulleys and belt 85. The speed at which feed rolls 83 and 84 move the sheets is the same as the slowed down speed of the sheets due to the retarding action of the slow-down rolls 75, 76. Thus, some provision must be made for quickly removing the pair of sheets from belts 63 after the sheets have both been gripped by feed rolls 83, 84 in order that the subsequent pair which is moving faster due to the belts 63, does not prematurely overlap the previous pair. This action is accomplished by one of the knock-down bars 86 or 87 of the rotary knock-down member 88.

As shown in FIGURE 5 the bar 86 is travelling in the direction indicated by the arrow and acts to engage the trailing portion of the pair of sheets as soon as both the tissue and saran have been grasped by feed rolls 83, 84 and are released by the slow-down rolls 75, 76. As shown in FIGURE 7, the bar 86 pushes the pair of sheets downwardly, pulling the pair off table 73. The pair thus overlaps in hanging relationship with a previous pair. The timing is such that no more than 4 thicknesses of sheets are together at any one time.

Due to the gap between the pairs at the starting edge of the slow-down section (right hand edge in the drawing), bar 87 is free to pass upwardly between the pairs of sheets.

The rotary knock-down member 88 includes the end rings 90, 91 which have gear teeth around their periphery by means of which they are driven by gears 92, 93 respectively, fixed to shaft 94. Shaft 94 in turn is driven through gears 95, 96 fixed on shafts 94 and 61 respectively. The rings are supported for rotation on the inner fixed rings 97, 98 which are secured by screws 99 to their respective side walls 10, 11.

By means of this particular construction, the ends of the rotary member 88 are open and member 88 rotates around and encircles the table 73 and endless belts 63. The resulting structure is compact and efficient in operation.

Interfolding Section

The pairs of sheets are fed by rolls 83, 84 into the conventional interfolding rolls 100, 101 which each contain floating blades 102 and complementary grippers 103 whereby the sheets are alternately folded in one direction and then the other. These rolls may be of the general type shown in the U.S. Patent Number 1,871,301 or 1,886,312 and a detailed description of them is not thought to be necessary or desirable here. The alternately folded sheets form a continuous chain which is passed over a guide roll 105 where it drops into a container and folds into the arrangement shown in FIGURE 9.

FIGURE 11 schematically shows the positions of several pairs of sheets relative to one another after they have left the slow-down section. It will be noted that there are thicknesses of either three or four sheets of material as they pass through the interfold rolls.

The interfolding rolls 100 and 101 are driven in synchronism, by their respective gears 108 and 109, from shaft 7 through gears 110, 111, 112 and 108, the latter of which is fixed to roll 100. Gears 110 and 111 are helical gears, which are slidable axially with respect to one another by crank 114 so as to adjust the timing between the blades and grippers of one roll with respect to the complementary blades and grippers of the other interfolding roll.

Guide roll 105 is fixed on its shaft 115 which is driven from the interfolding roll 100 through an overrunning clutch 116 and suitable sprockets and chain 113. The pairs of sheets cling together in chain-like fashion and as they come to rest in the container 107 they collapse along their fold lines and form into a pile.

Means are provided for forming the finished pile into batches of a predetermined number. Referring to FIGURES 4 and 6, it will be seen that the guide roll shaft 115 has a sprocket 115a secured adjacent one end and over which is trained a chain 117. A spring 118 is secured at one end to one end of this chain and is anchored at its other end to the machine frame at 119; the other end of the chain is fastened to the rod 120 of the cylinder 121. Cylinder 121 may be of various types, such as an air operated single acting type which is actuated by compressed air directed into its head end via conduit 122 and the solenoid operated valve 123. The solenoid valve is actuated by a conventional and settable counter mechanism (not shown) at the end of a predetermined number of revolutions of a machine part, such as for example, the knife. Thus the cylinder is periodically operated to cause its rod 120 to rapidly advance the shaft 115 through the overrunning clutch 125. This periodic rapid advance of the otherwise constantly rotatable shaft 115 causes a separation or shifting of sheets in the pile to thereby give a gap to indicate a batch of sheets of a predetermined number.

Recapitulation

The present invention provides a particularly efficient machine which associates two different webs of material together and feeds them at a differential speed to a cutting mechanism. While feeding these webs at a differential speed other means are provided for maintaining each of the webs taut. When the pairs of sheets, which are formed by the cutting mechanism, leave the latter, one sheet of the pair is longer than the other. These pairs are then conveyed together by a single suction belt to the slowdown and interleaving section.

The slowdown and interleaving section provided by the present invention is an integral and compact unit which is efficient in conveying the pairs of sheets, retarding them momentarily in their movement, and then discharging them to a pair of feed rolls which are moving slower than the speed at which the pairs entered the slow-down unit. After each pair has been grasped by the feed rolls and as soon as it is released by the slow-down rolls, one of the knock down bars contacts the pair to pull the remaining portion of the pair from the belt and push it downwardly where it hangs from the feed rolls in interleaved relationship with the other pairs of sheets. The interleaved pairs thus form a continuous chain of sheets of material which are fed through the interfolding rolls. This chain alternately varies in thickness between three and four sheets of material.

The resulting product comprises a stack of individual pairs of material. Each pair comprises one sheet of longer length than the other by means of which extra length the pair many be readily pulled from the stack.

Various modes of carrying out the invention are contemplated as being within the scope of the following claims particularly pointing out and distinctly claiming the subject matter which is regarded as the invention.

We claim:

1. An interfolding machine for associating two webs of flexible material together and forming interfolded sheets therefrom, said machine comprising: rotary cutting means for simultaneously cutting both webs together into pairs of sheets; a pair of feed rolls of different peripheral speeds and between which both of said webs pass whereby said webs are fed together but at different speeds to said cutting means; tensioning means located at the discharge side of said feed rolls but before the cutting means for maintaining the webs taut as they are fed to said cutting means, said tensioning means including a pair of opposed rotary members of different peripheral speeds and between which both webs pass, conveying means for receiving said pairs from said cutting means for conveyance therefrom; a slow-down and interleaving section to receive said pairs from said conveying means, said section including, a rotary knockdown member mounted for rotation about an axis normal to the direction of movement of said pairs, said member having circumferentially spaced and transversely arranged knock-down bars, suction belt means located within the space defined by rotation of the knock-down member for moving said pairs therethrough, slow-down rolls within said space and adjacent said suction-belt means for contacting and slowing down said pairs in their movement by said suction-belt means, a second pair of feed rolls mounted adjacent the discharge end of said suction-belt means for moving said pairs faster than they are moved by said slow-down rolls, said knock-down bars adapted to contact said pairs after they have been engaged by said second pair of feed rolls to thereby push said pairs downwardly to hang in interleaved relationship; and interfolding rolls adjacent the discharge side of said second pair of feed rolls for receiving said interleaved pairs therefrom.

2. A device as defined in claim 1 further characterized in that said slow-down rolls include a segmented roll which periodically contacts each of said pairs to retard movement thereof, the peripheral speed of said segmented roll being less than the speed of said suction belt means and corresponding to the peripheral speed of the said second pair of feed rolls.

3. An interfolding machine for associating two webs of flexible material together and forming interfolded sheets therefrom, said machine comprising; cutting means for simultaneously cutting both webs together into pairs of sheets, feed means for feeding said webs together but at different speeds to said cutting means, tensioning means located at the discharge side of said feed means but before the cutting means for maintaining the webs taut as they are fed to said cutting means, conveying means for receiving said pairs from said cutting means for conveyance therefrom; a slow-down and interleaving section to receive said pairs from said conveying means, said section including, a rotary knock-down member mounted for rotation about an axis normal to the direction of movement of said pairs, said member having circumferentially spaced knock-down bars, suction belt means located within the space defined by rotation of the knock-down member for moving said pairs therethrough, slow-down rolls within said space and adjacent said suction-belt means for contacting and slowing down said pairs in their movement by said suction-belt means, feed rolls mounted adjacent the discharge end of said suction-belt means for moving said pairs faster than they are moved by said slow-down rolls, said knock-down bars adapted to contact said pairs after the latter have been engaged by said feed rolls to thereby push said pairs downwardly to hang from said rolls in interleaved relationship; and interfolding rolls adjacent the discharge side of said feed rolls for receiving said interleaved pairs therefrom.

4. A machine for associating two webs of flexible material together, cutting said webs into sheets and then interleaving said sheets, said machine comprising; cutting means for simultaneously cutting both webs together into pairs of sheets, feed means for feeding said webs together but at different speeds to said cutting means, tensioning means located at the discharge side of said feed means but before the cutting means for maintaining the webs taut as they are fed to said cutting means, a slow-down and interleaving section to receive said pairs and including, a rotary knock-down member mounted for rotation about an axis normal to the direction of movement of said pairs, said member having circumferentially spaced knock-down bars, conveying means located within said member for conveying said pairs therethrough, slow-down rolls within said space and adjacent said conveying means for contacting and slowing down said pairs in their movement by said conveying means, and second means mounted adjacent the discharge end of said conveying means for moving said pairs faster than they are moved by said slow-down rolls, said knock-down bars adapted to contact said pairs after the latter have been engaged by said second means to thereby pull the trailing portion of an engaged pair from said conveying means and push said portion downwardly to hang from second feed means.

5. A device defined in claim 4 further characterized in that the pair moving speed of said slow down rolls is the same as said second feed means and less than the web moving speed of the first mentioned feed means.

6. A machine for associating two webs of flexible material together, cutting them into sheets and arranging them in interleaved relationship, said machine comprising; cutting means for simultaneously cutting both webs together into pairs of sheets, feed means for feeding said webs together but at different speeds to said cutting means, tensioning means located at the discharge side of said feed means but before the cutting means for maintaining the webs taut as they are fed to said cutting means, a rotary knock-down member mounted for rotation about an axis normal to the direction of movement of said pairs, said member having circumferentially spaced knock-down bars, suction belt means located within the space defined by rotation of the knock-down member for moving pairs discharged from said cutting means through said space, slow-down rolls within said member and adjacent said suction-belt means for contacting and slowing down said pairs in their movement by said suction-belt means, and feed rolls mounted adjacent the discharge end of said suction-belt means for moving said pairs faster than they are moved by said slow-down rolls, said knock-down bars adapted to contact said pairs after the latter have been engaged by said feed rolls to thereby push said pairs downwardly to hang from said rolls in interleaved relationship.

7. A machine for associating two webs of flexible material together, cutting them into sheets and arranging them in inter-leaved relationship, said machine comprising; cutting means for simultaneously cutting both webs together into pairs of sheets, feed means for feeding said webs together but at different speeds to said cutting means, a rotary knock-down member mounted for rotation about an axis normal to the direction of movement of said pairs, said member having circumferentially spaced knock-down bars, suction belt means located within the space defined by rotation of the knock-down member for moving pairs discharged from said cutting means through said member, slow-down rolls within said space and adjacent said suction-belt means for contacting and slowing down said pairs in their movement by said suction-belt means, and feed rolls mounted adjacent the discharge end of said suction-belt means for moving said pairs faster than they are moved by said slow-down rolls, said knock-down bars adapted to contact said pairs after the latter have been engaged by said feed rolls to thereby push said pairs downwardly to hang from said rolls in interleaved relationship.

8. In a machine for associating two webs of flexible material together, cutting them into pairs of sheets, and interleaving said pairs, a slow-down and interleaving section including, a rotary knock-down member mounted for rotation about an axis normal to the direction of movement of said pairs through said machine, said member having circumferentially spaced knock-down bars, suction belt means located within the space defined by rotation of the knock-down member for moving said pairs therethrough, slow-down rolls within said space and adjacent said suction-belt means for contacting and slowing-down said pairs in their movement by said suction-belt means, and feed rolls mounted adjacent the discharge end of said suction-belt means for moving said pairs faster than they are moved by said slow-down rolls, said knock-down bars adapted to contact said pairs after the latter have been engaged by said feed rolls to thereby push said pairs downwardly to hang from said rolls in interleaved relationship.

9. A machine as set forth in claim 8 further characterized in that said slow-down rolls include a segmented roll which periodically contacts said pairs to thereby retard movement thereof, the peripheral speed of said segmented roll being less than the speed of the suction belt means.

10. In a machine for associating two webs of flexible material together, cutting them into pairs of sheets, and interleaving said pairs, an improved interleaving section including, a rotary knock-down member mounted for rotation about an axis normal to the direction of movement of said pairs through said machine, said member having circumferentially spaced knock-down bars, suction belt means located within the space defined by the rotating bars for moving said pairs through said member, and feed rolls mounted adjacent the discharge end suction belt means for moving said pairs faster than they are moved by said slow-down rolls, said knock-down bars adapted to contact said pairs after the latter have been engaged by said feed rolls to thereby push said pairs downwardly to hang from said rolls in interleaved relationship.

11. A method of producing interfolded pairs of sheets of material from two different webs comprising, associating the two webs of material together, feeding the associated webs together in the same direction but at different speeds from one another, simultaneously cutting said webs to form pairs of different length sheets, conveying said pairs in single file and away from said cutting means at one speed to form a separation between each of said pairs, successively slowing down each pair from said one speed, grasping the leading edge of each said pair while moving at the slowed-down speed, and then pushing the trailing edge of the grasped pair downwardly so as to be in interleaved and downwardly hanging position with a previous pair.

References Cited in the file of this patent

UNITED STATES PATENTS

| | | |
|---|---|---|
| 1,632,433 | Christman | June 14, 1927 |
| 1,938,536 | Brenn | Dec. 5, 1933 |
| 2,043,829 | Grant et al. | June 9, 1936 |
| 2,092,952 | Campbell | Sept. 14, 1937 |
| 2,095,919 | Chambon | Oct. 12, 1937 |